R. J. GATLING.
Shovel-Plow.
No. 5,130.                                             Patented May 29, 1847.
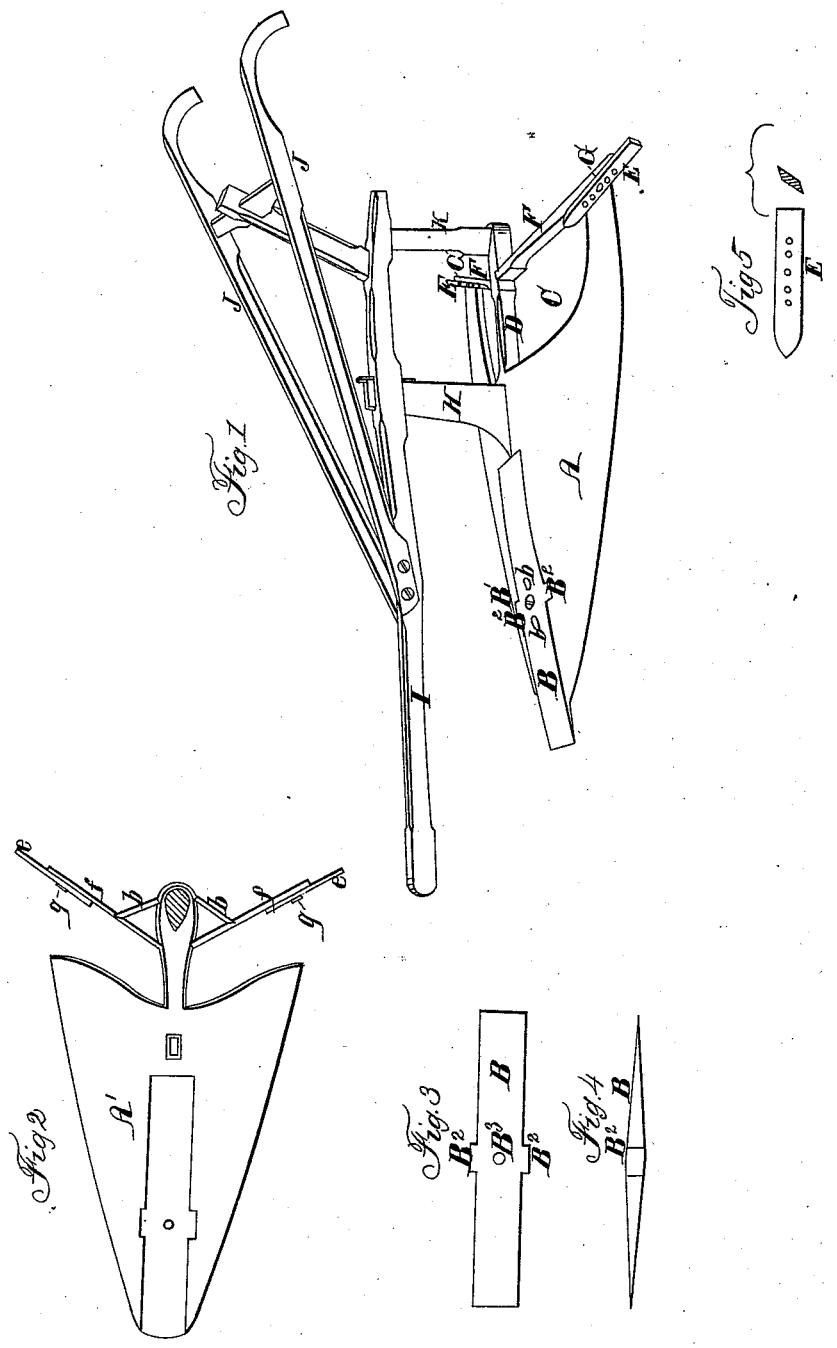

UNITED STATES PATENT OFFICE.

RICHARD J. GATLING, OF MURFREESBOROUGH, NORTH CAROLINA.

IMPROVEMENT IN SHOVEL-PLOWS.

Specification forming part of Letters Patent No. 5,130, dated May 29, 1847.

*To all whom it may concern:*

Be it known that I, RICHARD J. GATLING, of the town of Murfreesborough, in the county of Hartford and State of North Carolina, have invented a new and useful Improvement in the Cultivator for Cultivating Cotton and other Plants called "Gatling's Improved Shovel-Plow," which is described as follows, reference being had to the annexed drawings of the same, making part of this specification.

Figure 1 is a perspective view of the cultivator. Fig. 2 is a plan of the double share. Fig. 3 is a plan of the reversible or changeable point. Fig. 4 is a side view of the same. Fig. 5 is a plan of one of the wings.

From considerable experience as a cotton-planter and much observation in regard to the nature of the cotton-plant and of the different soils and climates in which it is cultivated in the Southern States, I long since came to the conclusion that the common shovel-plows and cultivators in general use among our planters were not adapted to produce the results desired. I therefore turned my attention to the improvement of this important implement of agriculture, and the result is the production of the article represented in the annexed drawings and described in the following specification. As the young cotton-plants increase in strength the soil is required to be stirred and brought up around them at the various periods of growth, according to the strength of the plant and the nature of the soil, which is easily determined by the planter, and which he accomplishes with ease by the use of the common hoe; but when he makes use of the common cultivator drawn by a horse he cannot regulate the degree of pulverization of the earth and the quantity to be brought around the roots of plants so exactly as with the hoe.

In order to approximate to the required results I form the cultivator in the manner represented at A A', Figs. 1 and 2, the double share or cultivator being made of good cast-iron, convex on top and concave underneath, with a depression, cavity, or recess on the top, in the center, and extending from the colter to the point, of such form, size, and depth as to admit of a changeable or reversible cutter or point made of corresponding size and shape. B, Fig. 3, represents said changeable point. $B^2$ are shoulders or wings cast with it, and which fit into corresponding depressions cast in the body of the plow, to hold it firmly in its proper position during the operation of opening a furrow.

$B^3$ is an aperture in the center of the cutter, to admit a screw, B', Fig. 1, that holds it firmly in its seat on the body of the plow. This point or cutter thus made and arranged admits of four changes of position. The point can have more than one hole through it, if desired, as shown at *b b*, Fig. 1.

The hind part of the double share A' is made with a semi-elliptical cavity, C, divided into two segments by the central longitudinal bar, D, for the reception of a portion of the earth after being cut and stirred up by the point B and double share A, the rest of the loosened soil being directed against the cotton-plants by two oblique wings or adjustable mold-boards, E, attached to the hindermost ends of the double share, as shown at E, Fig. 1, or not attached to the double share, as shown at *e* in Fig. 2. These wings are made adjustable, so that they can be extended or contracted in width at pleasure, according to the quantity of earth to be thrown around the plants by means of a row of holes in each of them, which admit of a bolt or pin, G, fastened in an oblique brace, F, extending from the central bar, D, to the rear end of the share A. There is one of said braces on each side of the center of the plow. In Fig. 2 the braces *f* are represented as braced to the beam by other braces, *b*.

The adjustable mold-boards E are made of a rhomboidal shape in their cross-sections, so that the lower edge may be nearly horizontal, while the face stands at an angle of about five degrees from a vertical line, causing the lower edge to act as a cutter or scraper. The position of this reversible mold-board can be reversed at pleasure, so as to bring the lower edge uppermost.

The cutter H, Fig. 1, can be cast solid with the body of the plow, or it may be made in a separate piece of wrought-iron, if desired.

The beam I, handle J, and sheth K may be made and arranged in the usual manner.

What I claim as my invention, and desire to secure by Letters Patent, is—

1. Making the cultivator with adjustable sliding wings E, of a rhomboidal form in their cross-sections, arranged and operating in the manner and for the purpose described.

2. Extending the rear or wide portions of the double share A back in the form of two flat curved wings, forming the curved spaces C, and to which the side bars or braces F are attached, and upon which the adjustable wings or mold-boards E are placed, in the manner and for the purpose set forth.

3. Making the point in the form of a double wedge, with wings or shoulders $B^2$, to fit into corresponding mortises in the share, for securing the same, being reversible at pleasure as the point wears, susceptible of four changes.

R. J. GATLING.

Witnesses:
   WM. P. ELLIOT,
   A. E. H. JOHNSON.